(12) United States Patent
Byrne et al.

(10) Patent No.: US 9,531,145 B2
(45) Date of Patent: Dec. 27, 2016

(54) BRANCHED ELECTRICAL SYSTEM (71) Applicants: Norman R. Byrne, Ada, MI (US);
Daniel P. Byrne, Lowell, MI (US);
Timothy J. Warwick, Sparta, MI (US);
Thomas A. Petersen, Sand Lake, MI (US); Randell E. Pate, Jenison, MI (US)

(72) Inventors: Norman R. Byrne, Ada, MI (US);
Daniel P. Byrne, Lowell, MI (US);
Timothy J. Warwick, Sparta, MI (US);
Thomas A. Petersen, Sand Lake, MI (US); Randell E. Pate, Jenison, MI (US)

( * ) Notice: Subject to any disclaimer, the term of this patent is extended or adjusted under 35 U.S.C. 154(b) by 0 days.

(21) Appl. No.: 14/714,805

(22) Filed: May 18, 2015

(65) Prior Publication Data

US 2015/0333461 A1 Nov. 19, 2015

Related U.S. Application Data (60) Provisional application No. 62/120,474, filed on Feb. 25, 2015, provisional application No. 62/000,427, filed on May 19, 2014.

(51) Int. Cl.
| | |
|---|---|
| *H01H 9/02* | (2006.01) |
| *H01H 13/04* | (2006.01) |
| *H01H 19/04* | (2006.01) |
| *H01H 21/04* | (2006.01) |
| *H01H 23/04* | (2006.01) |
| *H01R 13/46* | (2006.01) |
| *H02G 15/02* | (2006.01) |
| *H02G 15/08* | (2006.01) |
| *H02B 1/26* | (2006.01) |
| *A47C 7/62* | (2006.01) |
| *H01R 25/00* | (2006.01) |
| *H02M 7/00* | (2006.01) |
| *H01R 31/02* | (2006.01) |
| *H01R 31/06* | (2006.01) |

(52) U.S. Cl.
CPC ............ *H01R 25/006* (2013.01); *H01R 31/02* (2013.01); *H02M 7/003* (2013.01); *H01R 31/065* (2013.01)

(58) Field of Classification Search
CPC .......... H02G 3/06; H02G 3/10; H01R 25/006; H01R 31/065; H01R 31/02; B64D 11/0624
USPC ...... 174/75 R, 489, 500, 662; 361/622, 623; 439/502, 505; 307/22
See application file for complete search history.

(56) References Cited

U.S. PATENT DOCUMENTS

| | | | |
|---|---|---|---|
| 2,157,527 A * | 5/1939 | Clarke | .................... H04M 1/05 297/188.14 |
| 3,984,622 A | 10/1976 | Ross | |
| 4,099,824 A | 7/1978 | Schoppelrey | |

(Continued)

*Primary Examiner* — Chau N Nguyen
*Assistant Examiner* — Roshn Varghese
(74) *Attorney, Agent, or Firm* — Gardner, Linn, Burkhart & Flory, LLP (57) ABSTRACT A branched electrical system is adapted for providing multiple users with access to high and/or low voltage electrical power in work areas or high density seating areas, such as stadium or theater seating, work rooms, lecture halls, and public transportation vehicles. The system includes a main line and a plurality of branch lines, each branch line having at least one high voltage or low voltage electrical receptacle that is accessible to a user located at the seating, such as for powering a portable electronic device. The branch lines may be coupled to the main line via a splice or other electrical-mechanical connection.

16 Claims, 9 Drawing Sheets

(56) References Cited

U.S. PATENT DOCUMENTS

| | | | |
|---|---|---|---|
| 4,399,371 A * | 8/1983 | Ziff | H02G 3/00 307/147 |
| 4,434,377 A | 2/1984 | Shima et al. | |
| 5,234,360 A | 8/1993 | Kramer, Jr. | |
| 5,236,374 A | 8/1993 | Leonard et al. | |
| 5,238,424 A | 8/1993 | Vindum | |
| 5,283,392 A | 2/1994 | Ooshima et al. | |
| 5,414,212 A | 5/1995 | Clouet et al. | |
| 5,547,399 A | 8/1996 | Naghi et al. | |
| 5,616,968 A * | 4/1997 | Fujii | H02J 3/38 307/150 |
| 5,676,563 A | 10/1997 | Kondo et al. | |
| 5,902,148 A | 5/1999 | O'Rourke | |
| 6,133,845 A * | 10/2000 | Toms | A47B 83/001 307/147 |
| 6,179,381 B1 * | 1/2001 | Gevaert | A47C 7/72 297/217.3 |
| 6,207,894 B1 * | 3/2001 | Reiker | E04B 9/006 174/503 |
| 6,257,923 B1 | 7/2001 | Stone et al. | |
| 6,259,027 B1 | 7/2001 | Watanabe | |
| 6,281,434 B1 * | 8/2001 | Gretz | H02G 3/0431 174/502 |
| 6,281,439 B1 * | 8/2001 | Reiker | E04B 9/006 174/51 |
| 6,486,407 B1 | 11/2002 | Hawker et al. | |
| 6,746,273 B1 | 6/2004 | Liu et al. | |
| 6,767,255 B1 | 7/2004 | Croswell | |
| 6,786,765 B2 | 9/2004 | Bauermeister et al. | |
| 6,805,579 B2 | 10/2004 | Marchand et al. | |
| 7,057,108 B1 | 6/2006 | Sodemann et al. | |
| 7,066,616 B2 | 6/2006 | Howell | |
| 7,210,960 B2 | 5/2007 | Mak | |
| 7,229,302 B1 | 6/2007 | Lai | |
| 7,282,645 B2 | 10/2007 | Locke | |
| 7,285,021 B2 | 10/2007 | Bell et al. | |
| 7,467,967 B2 | 12/2008 | Kuo | |
| 7,511,226 B2 | 3/2009 | Fahey | |
| 7,537,485 B2 | 5/2009 | Bell et al. | |
| 7,591,673 B2 | 9/2009 | Chan et al. | |
| D604,253 S | 11/2009 | Andre et al. | |
| 7,614,911 B2 | 11/2009 | Hsieh et al. | |
| 7,624,503 B2 | 12/2009 | Fukuda | |
| 7,642,671 B2 | 1/2010 | Mahaffey | |
| D613,248 S | 4/2010 | Wu | |
| 7,751,206 B2 | 7/2010 | Kosacek et al. | |
| 8,003,888 B2 | 8/2011 | Owen, Sr. | |
| 8,004,115 B2 | 8/2011 | Chapel et al. | |
| 8,029,307 B2 | 10/2011 | O'Rourke | |
| 8,116,940 B2 | 2/2012 | Keller | |
| 8,235,746 B2 | 8/2012 | He | |
| 8,464,982 B2 * | 6/2013 | Raybell | B64D 11/06 244/118.5 |
| 8,574,010 B2 | 11/2013 | Wu | |
| 8,604,342 B2 | 12/2013 | Solon | |
| 8,608,505 B2 | 12/2013 | Mantay et al. | |
| 8,653,365 B1 | 2/2014 | Mixon | |
| 2002/0189841 A1 | 12/2002 | Patterson | |
| 2002/0195523 A1 * | 12/2002 | Cawley | B60N 2/0224 244/118.6 |
| 2004/0050573 A1 | 3/2004 | Lin et al. | |
| 2004/0182170 A1 | 9/2004 | Harju | |
| 2004/0256135 A1 | 12/2004 | Liu | |
| 2005/0011657 A1 * | 1/2005 | Johnston | H02G 3/0487 174/502 |
| 2006/0019532 A1 | 1/2006 | Kiss, Jr. | |
| 2008/0012423 A1 * | 1/2008 | Mimran | H01R 25/003 307/11 |
| 2008/0140565 A1 * | 6/2008 | DeBenedetti | G06Q 20/10 307/35 |
| 2008/0196936 A1 * | 8/2008 | Yamamoto | H01R 25/006 174/520 |
| 2009/0053926 A1 * | 2/2009 | Johnson | H01R 25/16 439/535 |
| 2010/0090851 A1 | 4/2010 | Hauser | |
| 2010/0139733 A1 | 6/2010 | Jonczyk et al. | |
| 2012/0028488 A1 | 2/2012 | Puschnigg et al. | |
| 2012/0261988 A1 * | 10/2012 | Byrne | H02J 3/00 307/35 |
| 2012/0295473 A1 | 11/2012 | Chen | |
| 2014/0041935 A1 | 2/2014 | Solon | |
| 2014/0076628 A1 | 3/2014 | McGrath et al. | |

\* cited by examiner

BRANCHED ELECTRICAL SYSTEM

CROSS REFERENCE TO RELATED APPLICATIONS

The present application claims the benefit of U.S. provisional application Ser. No. 62/000,427, filed May 19, 2014, and U.S. provisional application Ser. No. 62/120,474, filed Feb. 25, 2015, both of which are hereby incorporated by reference in their entireties.

FIELD OF THE INVENTION

The present invention relates to electrical power systems and, more particularly, to electrical power systems having multiple outlets arranged along a main conductor.

BACKGROUND OF THE INVENTION

The need or desire to incorporate electrical power outlets in different locations has increased as portable electronic devices such as laptop computers, mobile phones, digital cameras, and the like have proliferated, since these devices often require frequent charging of onboard batteries. Such devices typically require access to high voltage (e.g., 110V AC or 220V AC) power outlets and/or low voltage (e.g. 2V DC to 12V DC) power outlet.

SUMMARY OF THE INVENTION

The present invention provides a branched electrical system that supplies electrical power, such as AC power at 110V AC or 220V AC, or DC power in the range of about 2V to 12V, to a plurality of outlets for providing simultaneous access to the power by multiple users with portable electronic devices or the like. To account for voltage drop along a length of DC-energized electrical wiring, one or more power boosters may be coupled along the electrical wiring, which has a plurality of branches from a main line to provide electrical power at different locations that are equipped with electrical outlets along the main line. The branches may be spliced in to the main line, or the branches may be coupled to the main line via respective detachable connectors. The electrical outlets may have any number of different configurations, such as universal serial bus (USB), co-axial connector, 12V automotive-style connector, or the like, and it is envisioned that two or more different receptacles could be provided at an end of each branch, or along a mid portion of a given branch. Optionally, an electronic signal such as an audio signal may be conveyed along the main line to the branches, with access provided at respective receptacles or connectors. It is further envisioned that the receptacles may include weatherproofing covers or design features, such as for use in areas exposed to weather or risk of liquid spills or other contaminants. The low voltage version of the electrical system may be particularly well-suited to providing multiple users with access to low voltage electrical power in high density seating areas, such as stadium or theater seating, lecture halls, commercial aircraft, or the like.

According to one form of the present invention, a branched electrical system includes a main line, a plurality of branch lines coupled to the main line, and electrical receptacles in electrical communication with the main line via the branch lines. The main line has at least two main line electrical conductors, a first end portion electrically coupled to a power source, and a second end portion opposite the first end. The branch lines each have at least two electrical conductors with proximal end portions that are electrically coupled to respective ones of the main line electrical conductors. The branch lines further include respective distal end portions that are spaced away from the main line and the proximal end portions. An electrical receptacle is disposed at each of the distal end portions of the electrical conductors of the branch lines. The electrical receptacle is configured to engage an electrical connector of a portable electrical or electronic device.

In one aspect, the system further includes a DC electrical converter disposed between the power source and the first end of the main line. The DC electrical converter is operable to convert a high voltage AC power input at the power source to a low voltage DC power output at the first end portion of the main line.

In another aspect, at least one DC power booster is electrically coupled to the main line between the first end portion and the second end portion thereof.

In yet another aspect, a first plurality of the branch lines and a corresponding first plurality of the electrical receptacles are electrically coupled to the main line between the first end portion and the DC power booster, while a second plurality of the branch lines and a corresponding second plurality of the electrical receptacles are electrically coupled to the main line between the DC power booster and the second end portion.

In still another aspect, each of the proximal end portions of the electrical conductors of the branch lines are electrically coupled to the respective ones of the main line electrical conductors via an electrical splice connection. Optionally, an overmolded body is formed or disposed around each of the electrical splice connections.

In a further aspect, the branched electrical system includes a plurality of first electrical connectors disposed along the main line, and a plurality of second electrical connectors disposed at the proximal end portions of the branch lines. The second electrical connectors are configured to engage the first electrical connectors to thereby establish an electrical connection from the main line to each of the electrical receptacles.

In a still further aspect, the second electrical connectors are detachable from the first electrical connectors.

In another aspect, the electrical connectors include low voltage electrical connectors including at least one chosen from (i) a USB connector, (ii) a co-axial connector, and (iii) an automotive 12V connector. Optionally, at least one of the electrical connectors is an audio connector.

In a further aspect, the branched electrical system is combined with high density seating, such as stadium or arena seating, theater seating, or commercial vehicle seating. Optionally, the high density seating includes a plurality of seating surfaces and a plurality of armrests disposed between the seating surfaces. The electrical receptacles include low voltage DC receptacles mounted at respective ones of the armrests. Optionally, at least two of the low voltage electrical receptacles are mounted in each of the armrests. Optionally, the low voltage electrical receptacles are at least partially recessed in the armrests.

In yet another aspect, the electrical receptacles include high voltage AC receptacles. Optionally, the electrical receptacles include outlet blocks having high voltage AC outlets, low voltage DC outlets, and DC transformers in communication with the low voltage DC outlets and the electrical conductors of the branch lines.

In still another aspect, the branched electrical system includes an overmolded branch junction where each of the branch lines couples to the main line, and an optional C-shaped resilient clip may be provided for releasably engaging the overmolded branch junction, to facilitate securing the overmolded branch junctions to a work surface.

Thus, the branched electrical system of the present invention provides multiple users in with access to high or low voltage receptacles for charging portable electronic devices and/or supplying power to other power consumers, such as lamps, headphones, and the like. The branched electrical system may be particularly well-suited to providing multiple users with access to electrical power in high density seating areas, such as stadium or theater seating, lecture halls, and public transportation vehicles. By adding power boosters along a main line of a low voltage DC embodiment of the system, the length of the low voltage system can be extended to substantially any desired length.

These and other objects, advantages, purposes and features of the present invention will become apparent upon review of the following specification in conjunction with the drawings.

DESCRIPTION OF THE PREFERRED EMBODIMENTS

A branched electrical system is configurable to provide multiple user with access to electrical power in different environments including indoor work areas, public transit vehicles (e.g., buses, trains, ferries, commercial aircraft), auditoriums or theaters, indoor or outdoor stadiums or arenas, bleachers, or the like. The branched electrical systems may be configured to carry high voltage electrical power, such as 110V AC or 220V AC power, or may be configured to carry low voltage electrical power, such as about 2V DC to about 12V DC. In still other embodiments, a branched electrical system can be configured to carry or provide access to both high voltage AC power outlets and low voltage DC power outlets. This can be accomplished by providing one or more DC transformers at each branched electrical system, or by providing the branched electrical system with both high and low voltage conductors for the respective high and low voltage outlets. In the case of low voltage branched electrical systems having sufficient length that would otherwise result in an unacceptable amount of voltage drop, it is envisioned that a voltage booster may be electrically coupled to the system at a location spaced downstream from an upstream main power source. Moreover, the branched electrical systems are configurable as modular systems in which branches can be added or removed as desired, or may be configured as spliced-together systems in which the number of branches is generally set during manufacturing and not readily modifiable thereafter.

Figure 1:
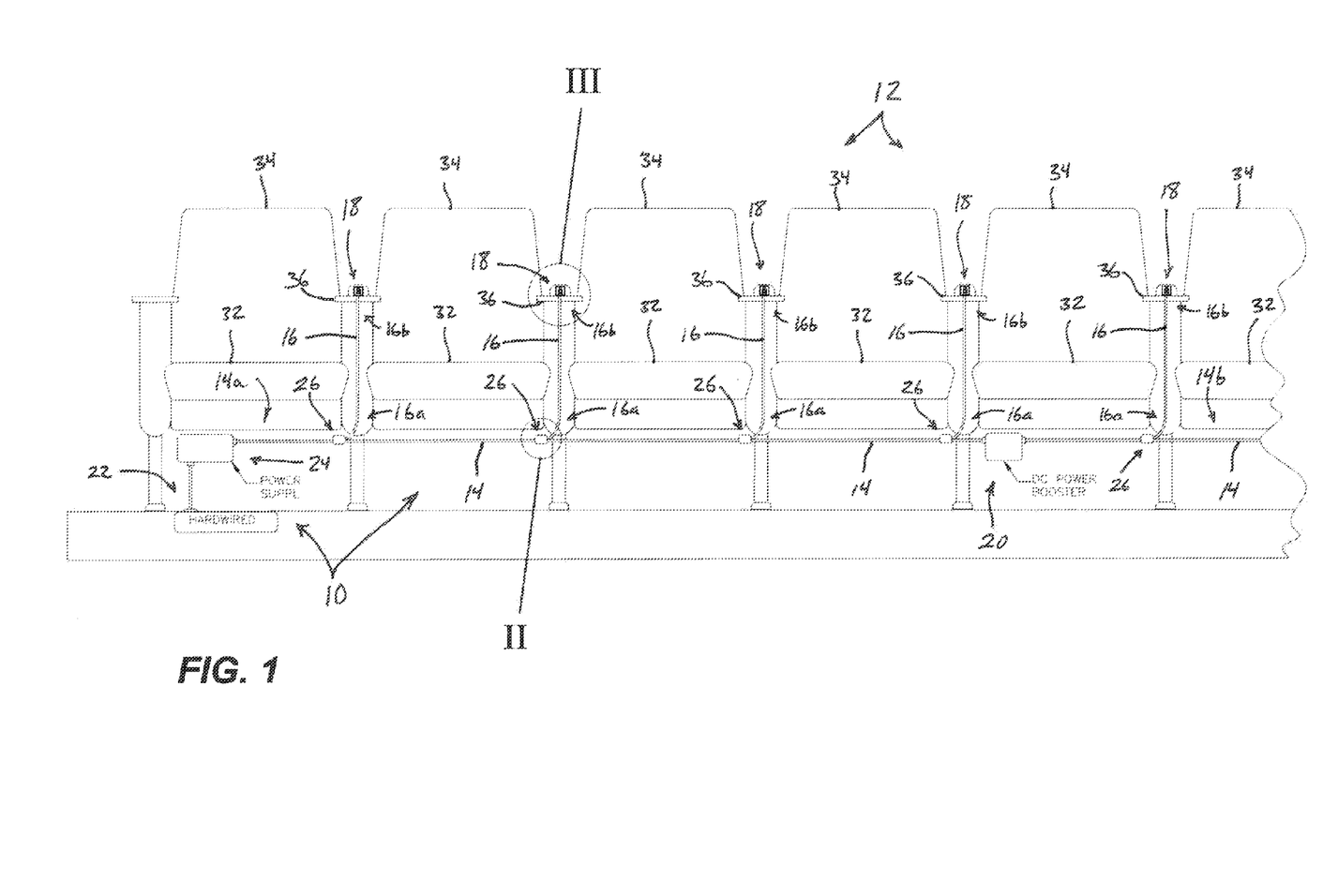
FIG. 1 is a front elevation of a low voltage branched electrical system in accordance with the present invention, shown in a section of high density stadium or theater seating.

Referring to the drawings and the illustrative embodiments depicted therein, a branched low voltage electrical system 10 is configured for mounting along a high density seating row 12 or similar arrangement, and includes a main line 14, a plurality of branch lines 16, and a plurality of low voltage electrical receptacles 18 at the ends of the branch lines (FIG. 1). Main line 14 may extend a substantial length and typically carries low voltage DC power that, in some cases, may exhibit an unacceptable voltage drop along its length, so that it may be desirable to install one or more DC power boosters 20 along main line 14 to maintain a sufficiently high DC voltage at each receptacle 18 that is serviced by main line 14.

Main line 14 has two main line electrical conductors of opposite polarities, and has a first end portion 14a that is electrically coupled to a power source 22 and a second end portion 14b opposite the first end portion, such as shown in FIG. 1. For applications where power source 22 is a high voltage AC power source, for example, a DC electrical power converter or power supply 24 may be coupled between power source 22 and main line 14, to supply main line 14 with low voltage electrical power, typically in the range of about 2V to 12V DC, although other voltages are equally possible. Main line 14 may have one or more additional conductors, such as to provide different voltages at different outlets, or to provide an electrical ground. Moreover, it is envisioned that it may be sufficient to provide only a single wire conductor of one polarity, while the opposite polarity is provided by electrically conductive structure associated with seating 12, similar to the arrangement that is common to automotive or other vehicular electrical systems.

In the illustrated embodiment of FIG. 1, DC electrical converter 24 is disposed between the power source 22, which is a hardwired connection to a high voltage AC circuit (such as at 110V or 220V AC), and the first end portion 14*a* of main line 14, so that DC electrical converter 24 converts a high voltage AC power input at the power source 22 to a low voltage DC power output at the first end portion 14*a* of main line 14. It is further envisioned that low voltage electrical system 10 may be coupled to a power supply via a conventional plug for connecting to a conventional AC wall outlet or floor outlet, instead of a hardwired connection, or may instead be supplied with power from a DC power source such as a battery, photovoltaic cells, combinations of the above, or the like. DC power booster 20 is electrically coupled along the main line 14 between the first end portion 14*a* and the second end portion 14*b*. Optionally, additional DC power boosters may be placed at desired intervals along main line 14, to extend main line 14 to substantially any desired length. For example, main line 14 may supply power to a first set of branch lines 16 and a corresponding set of low voltage electrical receptacles 18 between first end portion 14*a* and DC power booster 20, while a second set of branch lines 16 and a corresponding set of low voltage electrical receptacles 18 are electrically coupled to the main line 14 between DC power booster 20 and second or distal end portion 14*b* of main line 14.

Figure 3:
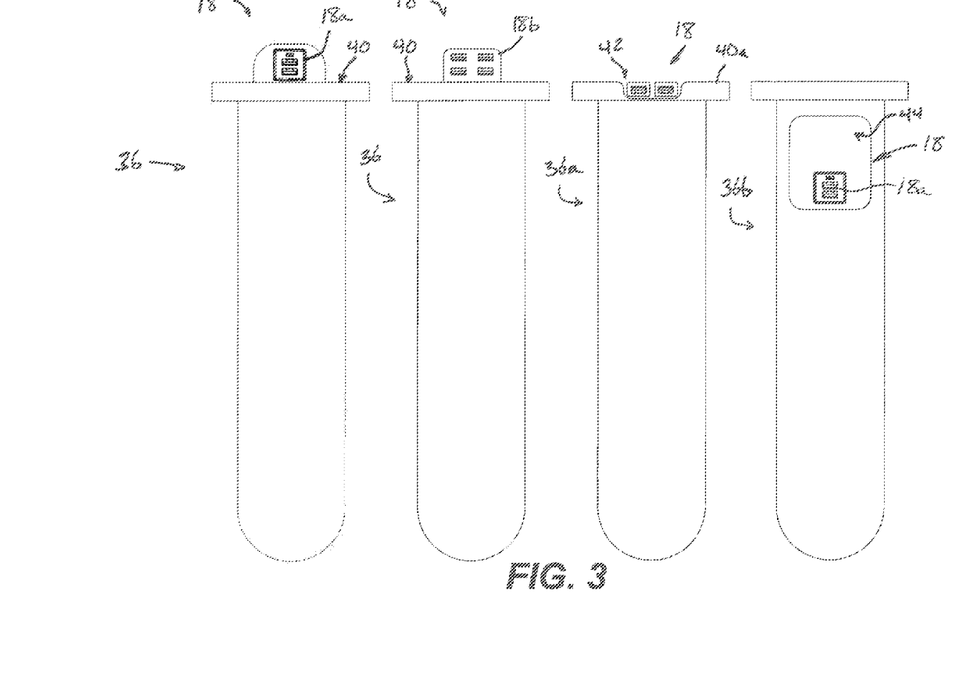
FIG. 3 provides four enlarged views of the area designated III in FIG. 1, showing four different options for low-voltage electrical connectors in an armrest portion of the seating.

Branch lines 16 each have two electrical conductors with proximal end portions 16*a* that are electrically coupled to the electrical conductors of main line 14. Branch lines 16 have distal end portions 16*b* that are spaced away from main line 14 and the proximal end portions 16*a*. Low voltage electrical receptacles 18 are disposed at distal end portions 16*b* of branch lines 16, and are mounted at or along a portion of seating 12, such as shown in FIGS. 1 and 3. Low voltage electrical receptacles 18 are configured to engage and supply power to a low voltage electrical connector of a portable electronic device, such as a hand-held computer, a tablet device, a mobile phone, laptop computer, a small appliance such as a low voltage lamp, audio headphones, or the like. For example, receptacles 18 may take the form of a USB-style low voltage DC connector, a co-axial DC connector, an automotive 12V connector, or the like. Optionally, the low voltage electrical receptacles or outlets may be fitted with weatherproofing covers or other weather-resistant design features, or with tamper-resistant design features, such as for use in areas that are exposed to weather or have an increased risk of liquid spills or other contaminants.

Figure 2:
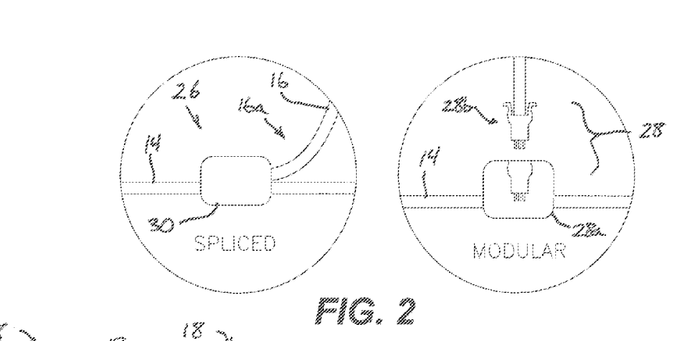
FIG. 2 provides two enlarged views of the area designated II in FIG. 1, showing two different options for low-voltage connections.

Branch lines 16 are electrically coupled at their proximal end portions 16*a* to main line 14 at respective electrical splice connections 26 (FIG. 1 and FIG. 2, at left) or, optionally, the branch lines 16 may be electrically coupled to main line 14 via a modular connector arrangement 28 including a first connector 28*a* (such as a female connector) associated with main line 14 and a second connector 28*b* (such as a male connector) associated with branch line 16, such as shown in FIG. 2, at right. In the case of splice connections 26, the electrical connections between the individual electrical conductors may be housed or contained within respective overmolded bodies 30 (at left in FIG. 2) that permanently seal, protect, and provide strain relief for the electrical connections throughout the life of the low voltage electrical system. Overmolded bodies 30 may be substantially solid rubber or polymeric material that is molded directly over and around the spliced electrical connections and around an outer insulating jacket of main line 14 on either side of the respective splice. However, it is envisioned that other types of protective housings or covers may be used, without departing from the spirit and scope of the present invention. In the case of modular connector arrangement 28, first connector 28*a* may establish a substantially permanent mechanical and electrical connection to second connector 28*b* upon full engagement, or may be configured to be removable from second connector 28*b*, such as upon depressing a resilient latch tab that normally secures the connectors to one another when they are in use.

As noted above, electrical system 10 is envisioned for use in high-density arrangements such as stadium or arena seating, theater seating, public transit seating, or the like. In the illustrated embodiment, high density seating arrangement 12 is configured as stadium, arena, or theater seating, and includes a plurality of seating surfaces 32 with corresponding seatbacks 34 and a plurality of armrests 36 disposed between seating surfaces 32, such as shown in FIG. 1. Low voltage electrical receptacles 18 are mounted at respective ones of the armrests 36, such as shown in FIGS. 1 and 3. Different arrangements and/or placement locations of low voltage electrical receptacles 18 are envisioned, such as shown in FIG. 3. For example, a dual-USB outlet 18*a* or a quad-USB outlet 18*b* may be provided in respective raised housings 38*a*, 38*b* at an upper surface 40 of a given armrest 36. Another armrest 36*a* (FIG. 3) may be configured with an upper surface 40*a* having a recessed region 42 with one or more low voltage electrical connectors 18, while another armrest 36*b* may be configured with one of dual-USB outlets 18*a* disposed in a forward surface 44. Optionally, outlets 18 may be mounted in the seating surfaces, seatbacks, structural components or aesthetic panels, without departing from the spirit and scope of the present invention.

Figures 4, 5:
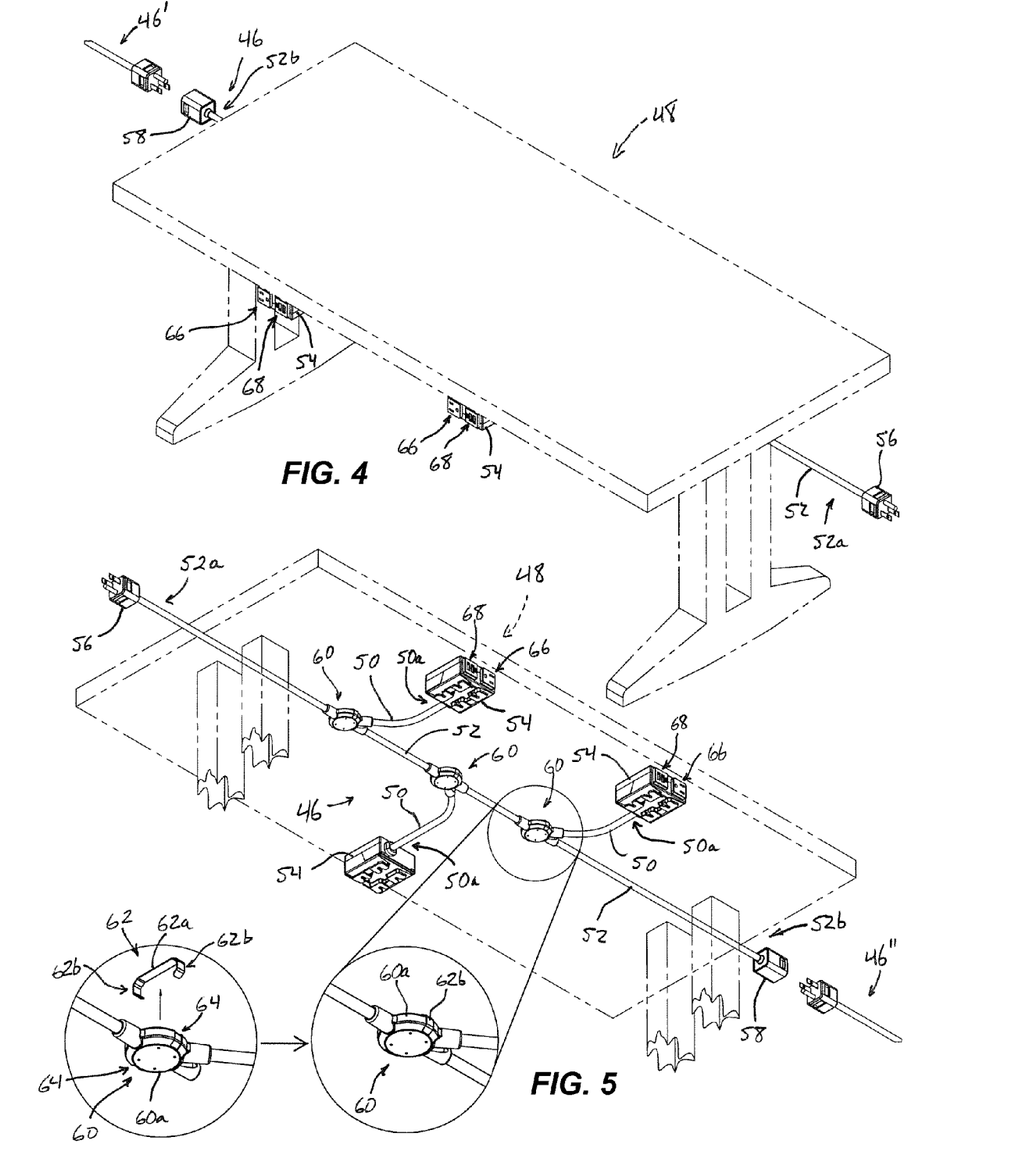
FIG. 4 is a top perspective view of a work table with a high and low voltage branched electrical system in accordance with the present invention.
FIG. 5 is a bottom perspective view of the work table and electrical system of FIG. 4, including enlarged views of a branch junction.

Referring now to FIGS. 4 and 5, a high and low voltage branched electrical system 46 is attached to the underside of a work table 48 and includes three branches 50 extending outwardly from a main line 52. Each branch 50 terminates at a respective outlet block or assembly 54 located at a distal end portion 50*a* of each branch 50. Main line 52 has a power plug 56 at an upstream end 52*a* for receiving power from an upstream power cable or system 46' (FIG. 4). Main line 52 also has an electrical receptacle 58 at a downstream end 52*b* for conveying power to a downstream electrical cable or system 46" (FIG. 5). Each branch 50 is electrically and mechanically coupled to main line 52 at a branch junction 60 through which passes electrical conductors of main line 52, and from which branch electrical conductors extend, as will be described in more detail below.

Optionally, branch junctions 60 are releasably securable to an underside of work table 48 via resilient C-shaped clips 62 (FIG. 5, enlarged views). Clips 62 have generally straight or planar central portions 62*a* that engage table 48, and may be secured to the table using mechanical fasteners such as threaded screws, rivets, snaps, hook-and-loop fasteners, magnets, or the like. Clips 62 have curved opposite end portions 62*b* on either side of central portion 62*a*, which curved end portions 62*b* are configured to extend partially around respective sides of a central body portion 60*a* of branch junction 60. Clips 62 may be made of resilient material such as spring steel, resinous plastic, or the like, so that curved end portions 62*b* can be spread apart to receive central body portion 60*a*, and then released so that curved end portions 62b grasp or clamp onto central body portion 60a. In the illustrated embodiment, central body portion 60a includes a recess 64 on each side thereof (also shown in FIGS. 9-11), which is sized and shaped to receive a respective one of curved end portions 62b so that central body portion 60a will be substantially secured without slipping relative to its respective clip 62.

In the illustrated embodiments of FIGS. 4-8, each outlet block or assembly 54 includes a high voltage AC receptacle 66 and a pair of USB-style low voltage DC receptacles 68. Each outlet block 54 is supplied with high voltage AC power via a respective branch 50, and contains a DC transformer (not shown) for converting the AC power input received by outlet block 54 into a low voltage DC output at low voltage DC receptacles 68. AC receptacle 66 is supplied with power directly from the conductors of branch 50. However, it will be appreciated that the output voltage at AC receptacle 66 may be changed as desired using electrical circuitry, as is known in the art. Outlet block assemblies 54 include attachment features in the form of keyhole openings or slots 70 (FIGS. 6-8) that are slid or urged into engagement with respective fastener heads that are protruding from an underside of table 48 and are provided for this purpose.

Figures 12A, 12B, 12C:
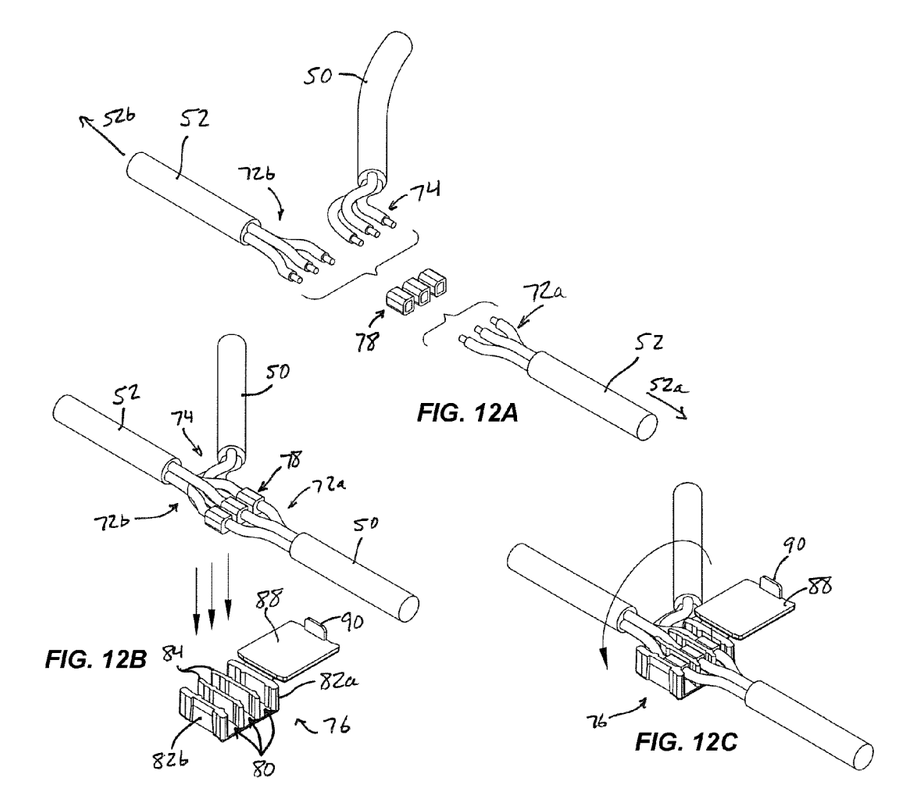
FIGS. 12A-12E depict six sequential steps of forming the branch junction.
Figures 12D, 12E:
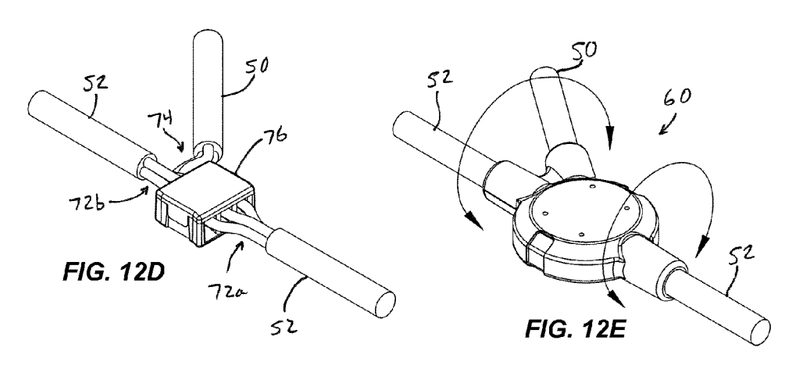

Branch junctions 60 are formed by first establishing electrical connections between main line conductors 72a, 72b and branch line conductors 74 (FIGS. 12A and 12B), securing the electrical connections with a strain relief 76 that also helps protect against short circuits (FIGS. 12B-12D), and overmolding the secured electrical connections to provide further strain relief and protection from environmental damage (FIG. 12E). Referring to FIG. 12A, an upstream or power supply side 52a of main line 52 includes hot, neutral, and ground conductors 72a, while a downstream side 52b of main line 52 includes corresponding hot, neutral, and ground conductors 72b. Branch line 50 includes hot, neutral, and ground branch line conductors 74. Downstream main line conductors 72b and branch line conductors 74 are electrically and mechanically coupled to corresponding ones of the upstream main line conductors 72a using crimping elements 78 or the like.

Figures 9, 10, 11:
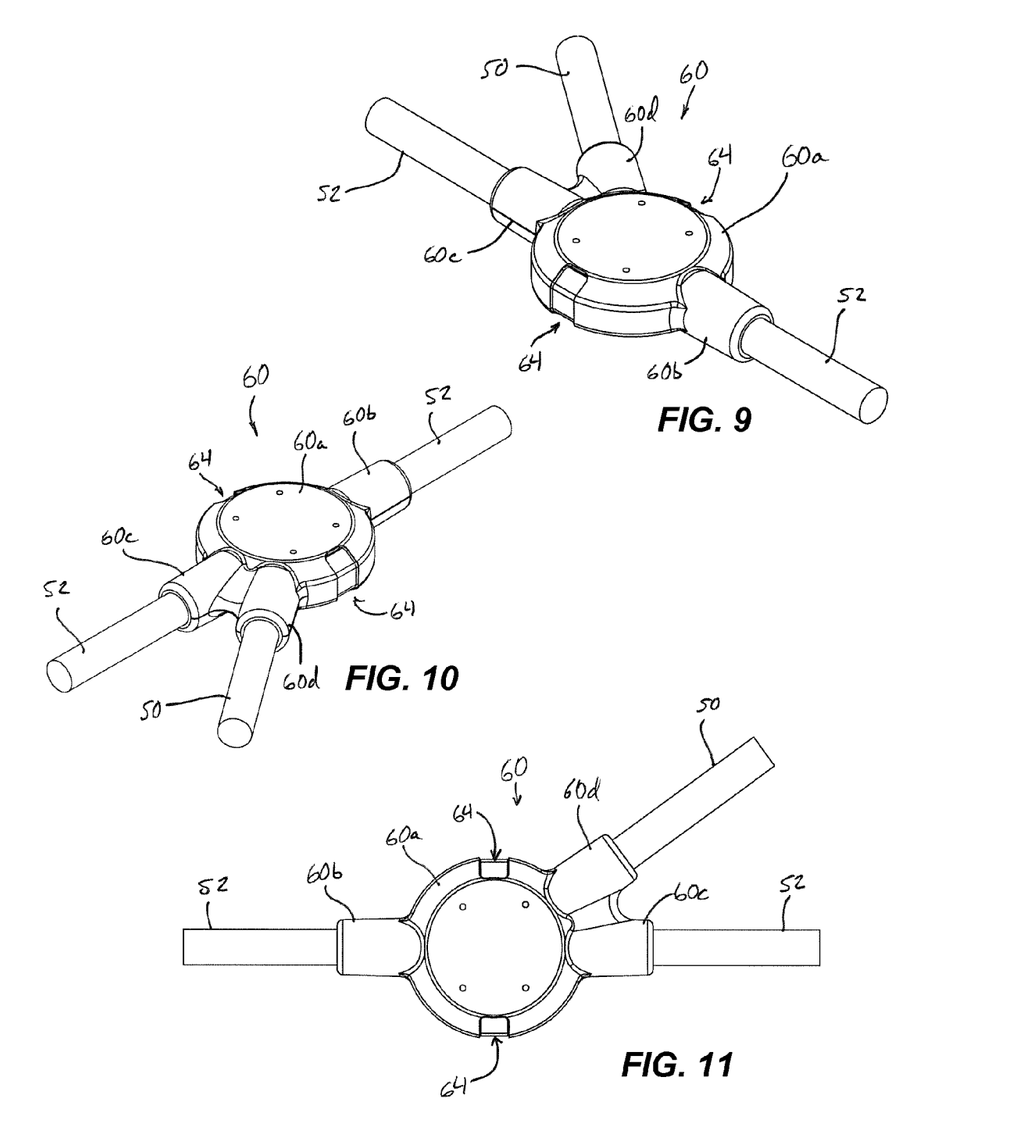
FIGS. 9 and 10 are perspective views of the branch junction in FIG. 5.
FIG. 11 is a top plan view of the branch junction.

Conductors 72a, 72b, 74 and crimping elements 78 are then inserted into respective channels 80 of strain relief 76 made of non-conducting material, such as shown in FIGS. 12B and 12C. Channels 80 are defined between a proximal end wall 82a, a distal end wall 82b, and a pair of central walls 84 that extend or project upwardly from a base wall 86, such as shown in FIG. 12B. A top cover 88 is pivotably coupled to proximal end wall 82a via a living hinge, and a latch tab 90 extends downwardly to engage distal end wall 82b so that cover 88 will be retained in a closed position such as shown in FIG. 12D. Once the conductors 72a, 72b, 74 are secured using crimping elements 78 and strain relief 76 (FIG. 12D), the region can be overmolded with a non-conductive material such as resinous plastic, natural or synthetic rubber, or the like, including central body 60a, a main line input arm 60b, a main line output arm 60c, and a branch arm 60d (FIGS. 9-11). Central body 60a and arms 60b-d may be unitarily formed in a molding process in which the main line, branch line, and electrical junction of FIG. 12D is placed in a mold, whereupon liquid material is injected and cured around the electrical wiring and insulating jacket materials. Thus, the material of central body 60a seals around strain relief 76 and the individual conductors 72a, 72b, 74 to provide a moisture-resistant and impact-resistant casing around the junction, while the material of arms 60b-d seal around the insulative outer jackets of main lines 52 and branch line 50, such as shown in FIG. 12E.

Figures 13, 14, 15, 16, 17:
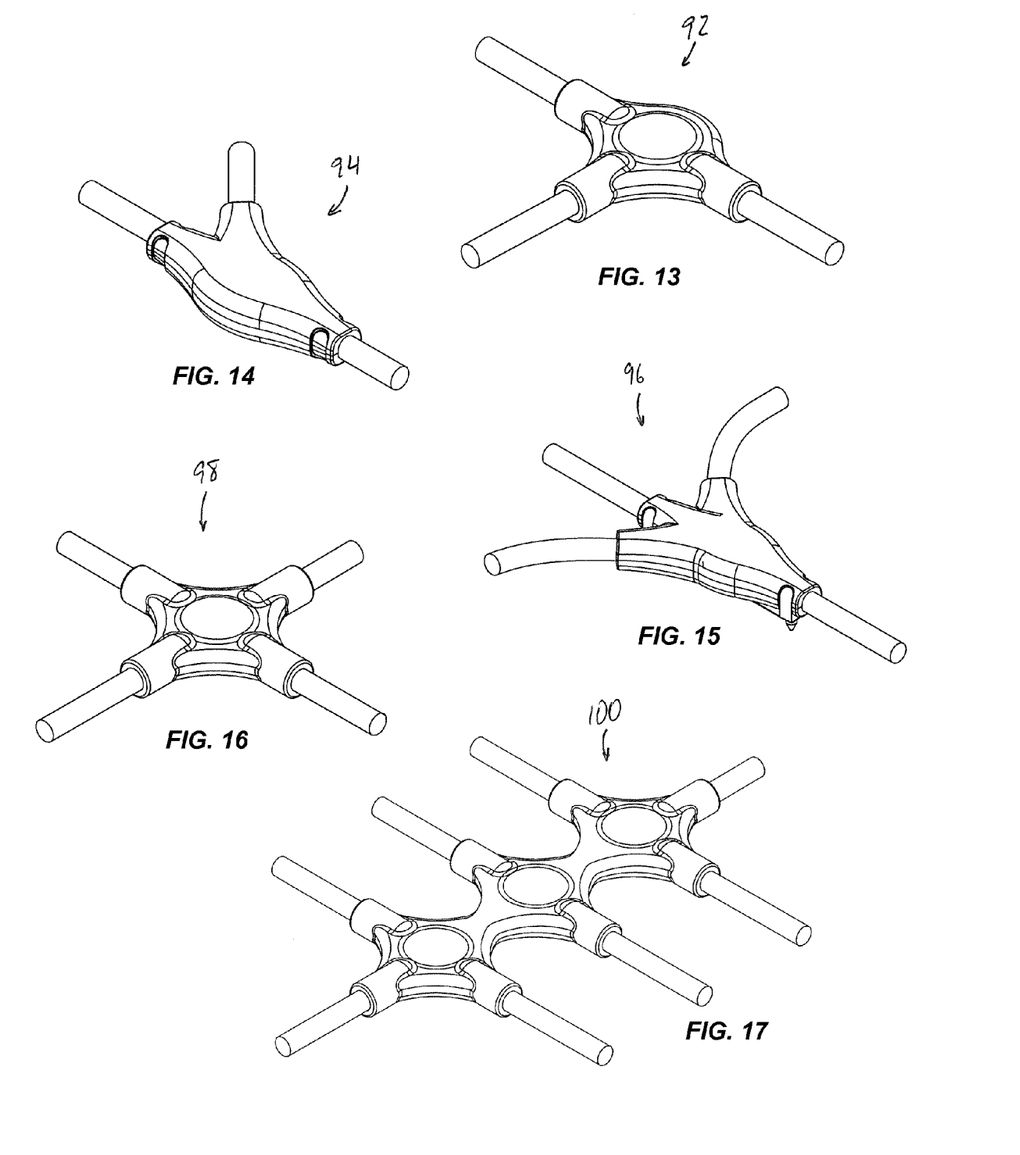
FIGS. 13-17 are perspective views of different branch junctions.

Although the angles and/or orientation of main line input arm 60b, main line output arm 60c, and branch arm 60d are not considered a factor for the electrical function of junction 60, the relative angles may be selected according to the general direction of an outlet receptacle at the end of each branch line 50. In addition, the angle of branch arm 60d relative to main line input arm 60b and main line output arm 60c can provide a visual cue to an installer of the general direction of the flow of electrical current through the branched electrical system, so that the proper orientation of one branched electrical system relative to another can be readily ascertained without reference to power plug 56 and electrical receptacle 58. Optionally, other types of junctions are envisioned, without departing from the spirit and scope of the present invention. For example, similar techniques as described above may be used to form a 90-degree branch junction 92 (FIG. 13), a 45-degree branch junction 94 (FIG. 14), a two-way 45-degree branch junction 96 (FIG. 15), a two-way 90-degree branch junction 98 (FIG. 16), or a six-way 90-degree branch junction 100 (FIG. 17).

Figure 18:
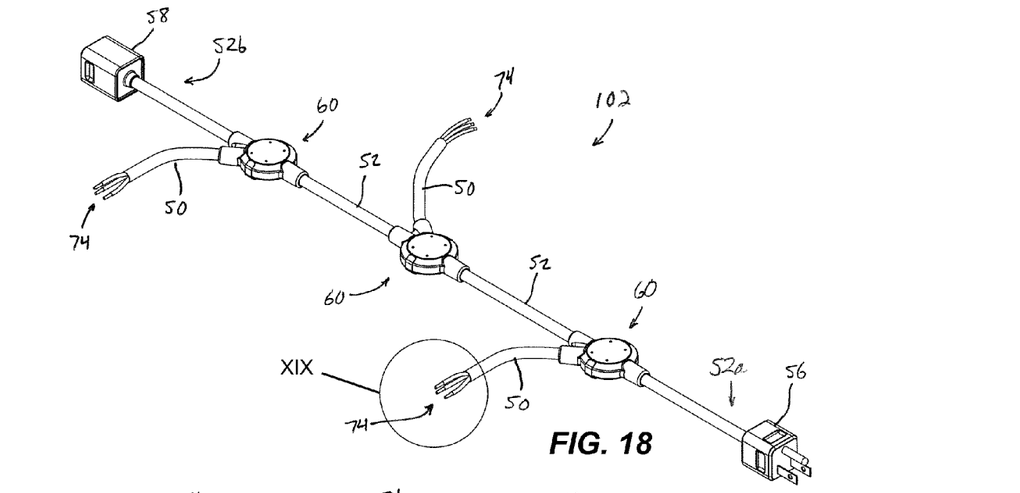
FIG. 18 is a perspective view of a high voltage branched electrical system.
Figure 19A:
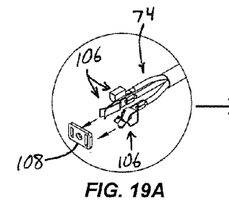
FIGS. 19A-19D are enlarged views depicting four sequential steps of installing an electrical outlet at the end of a branch at the area designated XIX in FIG. 18.
Figure 19B:
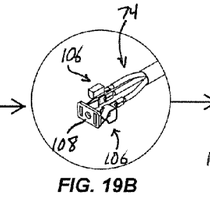
Figure 19C:
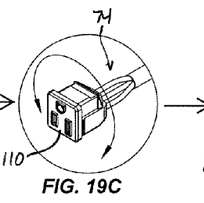
Figure 19D:
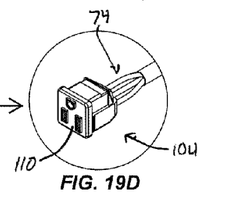
Figure 20:
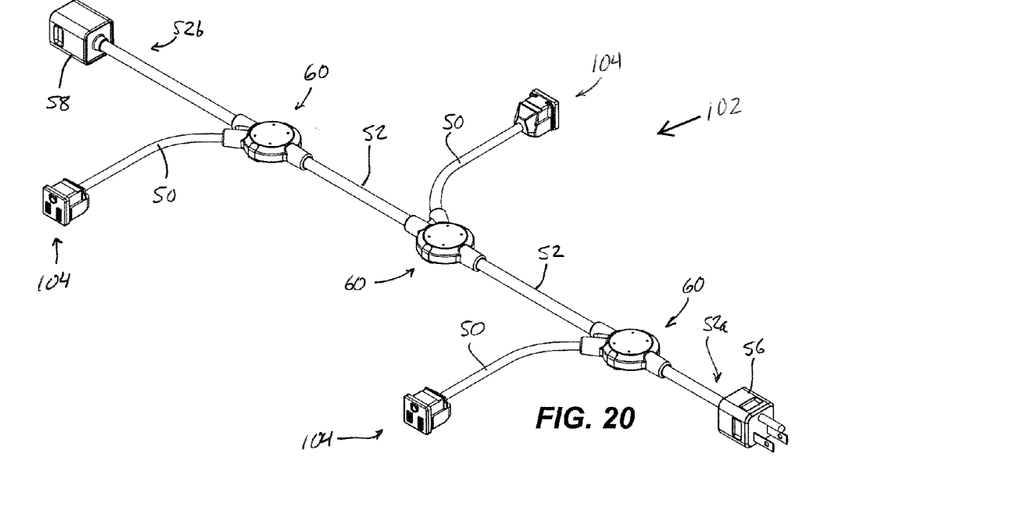
FIG. 20 is another perspective view of the high voltage branched electrical system of FIG. 18, in which each branch end includes an electrical outlet.
Figure 21:
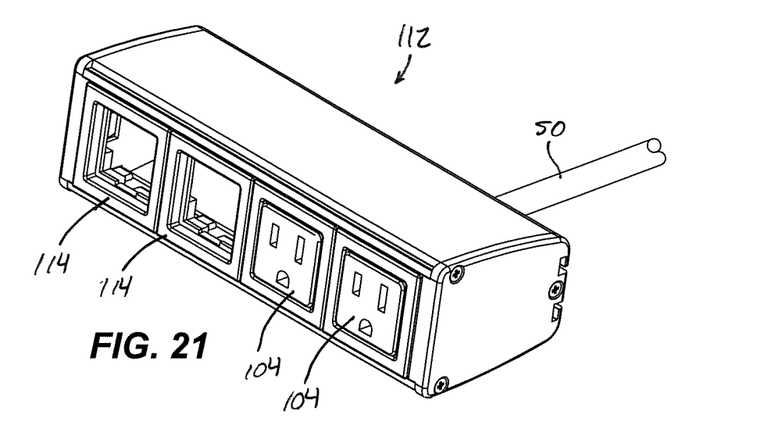
FIG. 21 is a perspective view of a modular outlet assembly that is compatible for use with the high voltage branched electrical system of FIG. 18.

It will be appreciated that electrical outlets may be provided at distal end portions 50a of branches 50 using various different techniques. For example, a high voltage branched electrical system 102 initially has exposed branch line conductors 74 (FIG. 18) that can be terminated with simplex receptacles 104 (FIG. 20), such as via a process shown in FIGS. 19A-19D. Each simplex receptacle 104 is formed by attaching respective terminals 106 on the ends of branch line conductors 74 and an optional fixture plate 108 is positioned in front of the hot and neutral terminals (FIGS. 19A and 19B). A rubber or rubber-like or resinous plastic housing 110 is then molded around terminals 106, fixture plate 108, and branch line conductors 74 to form a sealed and moisture-resistant body, such as shown in FIGS. 19C and 19D.

Figures 6, 7, 8:
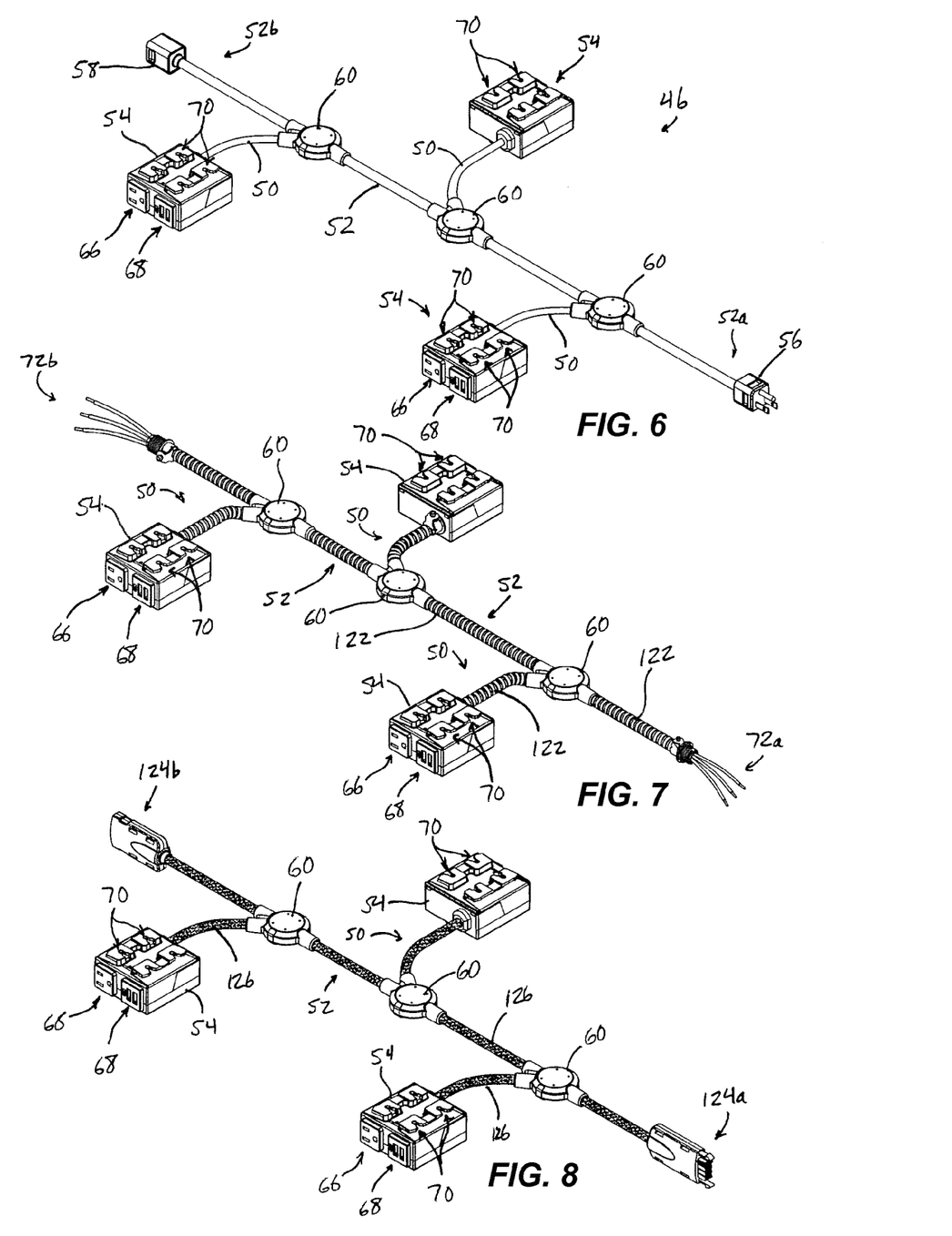
FIG. 6 is a perspective view of the branched electrical system of FIGS. 4 and 5.
FIG. 7 is a perspective view of another high and low voltage branched electrical system configured for hardwiring and with armored cables.
FIG. 8 is a perspective view of another high and low voltage branched electrical system configured for modular installation.
Figure 22:
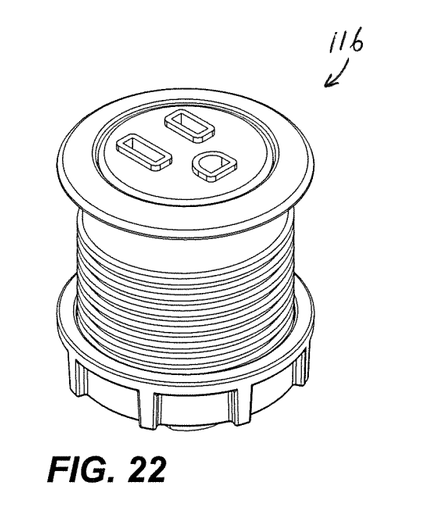
FIG. 22 is a perspective view of a high voltage AC grommet-style outlet that is compatible for use with the high voltage branched electrical system of FIG. 18.
Figure 23:
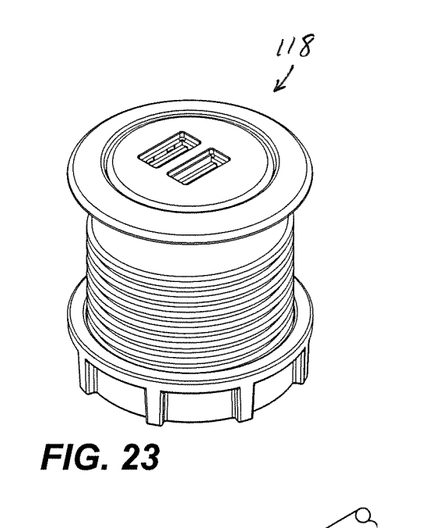
FIG. 23 is a perspective view of a low voltage DC grommet-style outlet that is compatible for use with either of the low voltage branched electrical system of FIG. 1 and the high voltage branched electrical system of FIG. 18.
Figure 24:
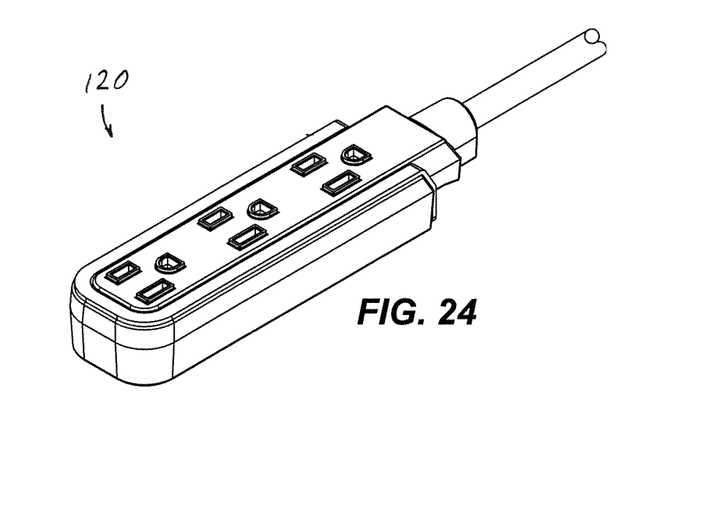
FIG. 24 is a perspective view of a 3-outlet high voltage AC power strip that is compatible for use with the high voltage branched electrical system of FIG. 18.

Other types of electrical outlets may be provided at one or more distal end portions 50a of branches 50. For example, a modular outlet assembly 112 can be fitted with a plurality of simplex receptacles 104, with extra spaces 114 provided for other types of receptacles or jacks or outlets, such as low voltage outlet receptacles (similar to receptacles 68), data and/or voice jacks, or the like. Such outlet assemblies are more fully described, for example, in commonly-owned U.S. Pat. Nos. 8,444,432 and 8,480,429, both of which are incorporated herein by reference in their entireties. Other electrical outlets may include, for example, a high voltage AC grommet-style outlet 116 (FIG. 22) configured for mounting in an opening formed or established in a work surface, a low voltage DC grommet-style outlet 118 (FIG. 23) also configured for mounting in an opening that is formed or established in a work surface, and a high voltage AC power strip 120 (FIG. 24). It is also envisioned that the high voltage and/or low voltage branched electrical systems may be configured for different installation locations, such as with reinforced or armored flex-conduit 122 used to protect main line 52 and branch lines 50 (FIG. 7), or with modular power connectors 124a, 124b that may be used for routing power through modular work areas or the like, and optionally with abrasion-resistant cord cover material 126 or the like (FIG. 8).

Accordingly, the branched electrical systems of the present invention provide multiple users with access to high and/or low voltage receptacles for charging portable electronic devices and/or supplying power to other high or low voltage power consumers, such as lamps, projectors, power tools, computers, headphones, and the like. The low voltage electrical system may be particularly well-suited to providing multiple users with access to electrical power in high density seating or work areas, such as stadium or theater seating, lecture halls, and public transportation vehicles.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A branched electrical system comprising:
a main line having at least two main line electrical conductors, said main line having a first end portion electrically coupled to a power source and a second end portion opposite said first end;
a plurality of branch lines each having at least two electrical conductors with proximal end portions that are electrically coupled to respective ones of said main line electrical conductors, and with distal end portions that are spaced away from said main line and said proximal end portions;
wherein each of said proximal end portions of said electrical conductors of said branch lines are electrically coupled to said respective ones of said main line electrical conductors via an electrical splice connection;
an overmolded body disposed and sealed around each of said electrical splice connections, said overmolded body having an outer surface and a pair of recesses formed at opposite sides of said outer surface;
a generally C-shaped resilient clip configured to releasably engage said overmolded body, said clip having a central portion and a pair of curved opposite end portions being inwardly spring-biased to engage said overmolded body at respective ones of said recesses, and wherein said central portion is configured to be secured to a support surface; and
an electrical receptacle disposed at each of said distal end portions of said electrical conductors of said branch lines;
wherein said electrical receptacle is configured to engage an electrical connector of a portable electrical or electronic device.

2. The electrical system of claim 1, further comprising a DC electrical converter disposed between the power source and said first end of said main line, wherein said DC electrical converter is configured to convert a high voltage AC power input at the power source to a low voltage DC power output at said first end portion of said main line.

3. The electrical system of claim 2, further comprising at least one DC power booster electrically coupled to said main line between said first end portion and said second end portion thereof; wherein said DC power booster is operable to maintain at least a threshold minimum voltage in said second end portion of said main line simultaneously with the power source maintaining said first end portion of said main line at at least the threshold minimum voltage.

4. The electrical system of claim 3, wherein a first plurality of said branch lines and a corresponding first plurality of said electrical receptacles are electrically coupled to said main line between said first end portion and said DC power booster, and wherein a second plurality of said branch lines and a corresponding second plurality of said electrical receptacles are electrically coupled to said main line between said DC power booster and said second end portion.

5. The electrical system of claim 1, wherein said overmolded body comprises a central body portion in which said recesses are defined, a main line input arm projecting outwardly from said central body portion in a first direction toward said first end portion, a main line output arm projecting outwardly from said central body portion in a second direction toward said second end portion, and a branch arm projecting outwardly from said central body portion in a third direction that is different from the first and second directions by at least about 45 degrees.

6. The electrical system of claim 5, further comprising a strain relief of insulative material positioned inside said overmolded body, said strain relief defining at least two channels for receiving and isolating respective sets of said main line conductors and said branch line conductors.

7. The electrical system of claim 5, wherein said main line input arm is sealed around only a first outer insulative jacket of said main line, said main line output arm is sealed around only a second outer insulative jacket of said main line, and said branch arm is sealed around only an outer insulative jacket of said branch line.

8. The electrical system of claim 1, wherein said electrical connectors comprise low voltage electrical connectors comprising at least one chosen from (i) a USB connector, (ii) a co-axial connector, (iii) an automotive 12V connector; and (iv) an audio connector.

9. The electrical system of any claim 1, further in combination with high density seating, wherein the high density seating comprises at least one chosen from (i) stadium or arena seating, (ii) theater seating, and (iii) commercial vehicle seating.

10. The electrical system and high density seating of claim 9, wherein said high density seating comprises a plurality of seating surfaces and a plurality of armrests disposed between said seating surfaces, and wherein said electrical receptacles comprise low voltage DC receptacles mounted at respective ones of said armrests.

11. The electrical system and high density seating of claim 10, comprising at least two of said low voltage electrical receptacles mounted in each of said armrests.

12. The electrical system and high density seating of claim 10, wherein said low voltage electrical receptacles are at least partially recessed in said armrests.

13. The electrical system of claim 1, wherein said electrical receptacles comprise high voltage AC receptacles.

14. The electrical system of claim 13, wherein said electrical receptacles comprise outlet blocks having high voltage AC outlets, low voltage DC outlets, and DC transformers in communication with said low voltage DC outlets and said electrical conductors of said branch lines.

15. A branched electrical system comprising:
a main line having at least two main line electrical conductors, said main line having a first end portion electrically coupled to a power source and a second end portion opposite said first end;
a plurality of branch lines each having at least two electrical conductors with proximal end portions that are electrically coupled to respective ones of said main line electrical conductors, and with distal end portions that are spaced away from said main line and said proximal end portions;
an overmolded body where each of said branch lines couples to said main line, wherein said overmolded bodies each comprise:
a central body portion having a pair of recesses formed at opposite sides thereof, a main line input arm projecting outwardly from said central body portion in a first direction toward said first end portion;

a main line output arm projecting outwardly from said central body portion in a second direction toward said second end portion, and a branch arm projecting outwardly from said central body portion in a third direction that is different from the first and second directions by at least about 45 degrees; and a plurality of generally C-shaped resilient clips each configured to releasably grip respective ones of said central body portions, said clips having opposite end portions that are spring-biased into engagement with said central body portions at respective ones of said recesses; and electrical receptacles disposed at respective ones of said distal end portions of said electrical conductors of said branch lines, wherein said electrical receptacles comprise outlet blocks having high voltage AC outlets, low voltage DC outlets, and DC transformers in communication with said low voltage DC outlets and said electrical conductors of said branch lines.

16. The electrical system of claim 15, wherein said clip comprises a central portion between said opposite end portions, wherein said central portions of said resilient clips and said outlet blocks are securable to support surface.

* * * * *